United States Patent [19]
Collins et al.

[11] 3,874,619

[45] Apr. 1, 1975

[54] RECIPROCATING POWERED WHEEL DRIVE

[75] Inventors: Richard Clement Collins, Bellevue; John Donald Mayer, Seattle; Bernard Britton Thompson, Bainbridge Island, all of Wash.

[73] Assignee: The Boeing Company, Seattle, Wash.

[22] Filed: May 3, 1974

[21] Appl. No.: 466,611

[52] U.S. Cl. .................... 244/50, 74/126, 180/7 R
[51] Int. Cl. ............................................ B64c 25/50
[58] Field of Search ........ 180/7 R, 8 R, 24.1, 24.07, 180/24.09, 44 R; 280/218; 74/126, 142; 244/50, 110 R

[56]  References Cited
UNITED STATES PATENTS

| | | | |
|---|---|---|---|
| 3,711,043 | 1/1973 | Cameron-Johnson | 244/50 |
| 3,770,072 | 11/1973 | Cheney | 180/44 R X |
| 3,807,664 | 4/1974 | Kelly, Jr. et al. | 244/50 |

FOREIGN PATENTS OR APPLICATIONS

| | | | |
|---|---|---|---|
| 1,224,618 | 9/1966 | Germany | 244/110 R |

Primary Examiner—Trygve M. Blix
Assistant Examiner—Paul E. Sauberer
Attorney, Agent, or Firm—Christensen, O'Connor, Garrison & Havelka

[57] ABSTRACT

A vehicle combination braking and driving system operates rotatively mounted brakes in a braking mode or in a driving mode wherein each brake acts as a coupling between a hydraulically powered reciprocative actuator and a vehicle wheel. Driving torque is exerted upon the wheel by alternately moving the actuator in one direction while simultaneously applying the wheel brake and moving the actuator in the reverse direction while releasing the brake. Multiple reciprocative actuators and respectively associated brakes may be operated with relatively offset phasing to achieve continuity of driving effort. The system is applicable to aircraft and other vehicles; also as a retrofit to existing aircraft by substituting the reciprocative actuators for the brake compensator rods in the main landing gear bogies.

23 Claims, 8 Drawing Figures

RECIPROCATING POWERED WHEEL DRIVE

BACKGROUND OF THE INVENTION

This invention relates to a drive system for a land vehicle and, more particularly, to a combination braking and self-propulsion system for a grounded aircraft operable by direct driving of the landing gear wheels using onboard power under the direct control of the flight crew. The invention is herein illustratively described by reference to the preferred embodiment thereof; however, it will be recognized that certain modifications and changes therein with respect to details may be made without departing from the essential features involved.

The increasing and air importance of large commercial jet aircraft requires that existing airport and terminal facilities be utilized in the most effective manner possible, while at the same time minimizing the deleterious environmental impact in the form of noise, jet blast and air pollution arising from ground maneuvering of large aircraft in the vicinity of the terminal. One of the most effective uses of existing terminal facilities involves taxiing and maneuvering with the main propulsion engines toward a nose-in dock with the terminal followed by pushing the aircraft back out to a taxi position where the main propulsion engines again can be used. The problem with this concept is that the operators of the aircraft must rely upon a tug and ground crew to back the aircraft out to a taxi position where the main engines may be used. In addition, taxiing between the taxi position and the main runway necessitates operation of the main engines at an off-design condition which has harmful economic and ecological implications.

As an alternative to the use of a ground tug, it has been proposed to propel the aircraft by direct traction of the landing gear wheels. This concept eliminates many of the economic and ecological problems inherent with ground operation using all the main engines because the power necessary to drive the aircraft wheels may be supplied by an idling main engine or an auxiliary power unit. However, the added equipment necessary to overcome the large breakaway and maneuvering forces involved in terminal maneuvering and taxiing increases the aircraft complexity, weight, maintenance requirements and cost. Further, the equipment needed to generate the high torque necessary to overcome the large breakaway forces encountered in initially moving the aircraft is unable to provide the relatively lower torque experienced in manuevering and in taxiing the aircraft at higher speeds.

Several attempts have been made to provide a powered wheel drive for an aircraft; but all involve complex actuating equipment which cannot be carried economically by an aircraft or which is not readily adaptable to existing landing gear structures. Such earlier attempts included a direct tire drive in which one or more rollers are applied directly to the tire tread resulting in eventual damage to the tire. Another involved use of a ring gear or other coupling means such as a pneumatic collar connecting a power source with the wheel through a heavy duty reduction gear and clutching arrangement. Still another device incorporated a separate drive train with differential connecting a main engine or other source of auxiliary power with the wheels.

Accordingly, it is an object of the present invention to provide an improved onboard auxiliary wheel drive system applicable to airplanes and other large vehicles under conditions when use of the vehicle's main propulsion is unfeasible.

An additional object is to provide a drive system capable of generating the high torque necessary to overcome the breakaway forces to initially move a large vehicle and also of driving and braking the vehicle in a controlled and safe manner for maneuvering purposes such as in moving a large airplane about on a loading or taxiing apron.

Another object is to provide a direct wheel drive system with capability of both braking and steering applicable to airplanes and other large vehicles.

A further object is to provide an economical, lightweight, structurally simple onboard direct wheel drive system and associated braking, steering and speed control means for aircraft making it possible to dispense with the use of ground tugs and to reduce the usage of jet or propeller thrust in ground maneuvers.

A related further object is to provide a wheel drive which may be installed on existing aircraft landing gear with minimum modifications.

A still further object is to provide an onboard hydraulic wheel drive for aircraft which utilizes existing aircraft hydraulic systems and structures and which may be isolated therefrom when not in use or in the event of a failure within the wheel drive hydraulic system.

Another object is to provide an onboard hydraulic wheel drive for aircraft which functionally utilizes the wheel brakes in driving the wheels, but which may be by-passed at any time to permit operation of the aircraft brakes in normal manner.

A specific object hereof is to provide an onboard wheel drive for aircraft utilizing the wheel brakes themselves to transmit driving torque to the wheels from reciprocative actuators with an acceptable degree of continuity in the driving effort produced and in such a manner as to permit steering by differential control of the braking and driving means on opposite sides of the aircraft.

A further specific object hereof is to provide an onboard wheel drive for aircraft utilizing the wheel brakes themselves to transmit driving torque to the wheels from reciprocative actuators which also are operable to hold the brakes in stationary position for stopping the aircraft during taxiing and landing.

SUMMARY OF THE INVENTION

The combination braking and drive system according to the present invention operates a rotatively mounted wheel in a driving mode or alternatively in a braking mode. The brake is positioned and moved rotationally by a powered reciprocative brake positioning element. The wheel is driven by alternately actuating the brake positioning element for movement in one direction with the brake applied to rotate the wheel and for movement in the reverse direction with the brake released. By repeating the sequence, rotation is continued; by reversing it, the wheel is driven oppositely. During normal braking, the brake positioning means is fixed.

The drive system is applicable to one or more wheels, or rotative drive elements of the vehicle traction drive system. By utilizing two or more brakes on one or more wheels of a vehicle, and respectively associated brake positioning elements and operating the positioning means with relatively offset phasing, more sustained torque application is achieved for a given cycling frequency of one positioning means.

The combination driving and braking apparatus according to the present invention primarily was developed for both new aircraft and retrofit applications to existing aircraft. An important feature of the invention makes this possible by utilizing brake positioning elements which can be reciprocated by fluid pressure in place of the usual torque reacting brake compensator rods which are fixed.

According to another feature, the reciprocative positioning elements and their respectively associated brake actuators on opposite bogies may be differentially operated to effect steering of the aircraft.

Other features of the invention reside in the aircraft onboard hydraulic system for supplying and controlling application of hydraulic pressure fluid to the wheel drive brake positioning elements, including an isolation valve for isolating the wheel drive hydraulic system from the aircraft main hydraulic system when the wheel drive is not in use or in the event of a failure in the wheel drive hydraulic system. A shuttle valve operable with each brake associated with the wheel drive allows the wheel drive hydraulic system to be by-passed at any time to permit normal operation of the aircraft hydraulic brakes.

Still other features of the invention reside in the multi-wheel drive system hydraulic control elements for selectively energizing or de-energizing one or more of the aircraft brakes while simultaneously extending or retracting the associated brake positioning elements. During sustained drive operation of a wheel a cycling valve automatically reverses the direction of movement of the brake positioning elements at their stroke ends and coordinates therewith selective application of their respectively associated wheel brakes to move the aircraft in the selected direction. Such direction of motion is selected by a reversing valve which operates in conjunction with the cycling valve. Additional features of the invention reside in the hydraulic interconnection between two brake positioning elements for moving the brake positioning elements simultaneously in opposite directions using the exhaust flow from the element exposed to hydraulic system pressure fluid to displace the second element, thus reducing hydraulic flow requirements. The hydraulic interconnection also cooperates with fluid by-pass means in each brake positioning element to effect automatic displacement of the brake positioning elements to opposite at-rest or normal positions. Depressurization valves eliminate slamming due to inertia of the brake positioning elements at the end of their strokes.

These and other features, objects and advantages of the invention will become more fully evident from the following description thereof by reference to the accompanying drawings.

DETAILED DESCRIPTION OF THE DRAWINGS

Figure 2:
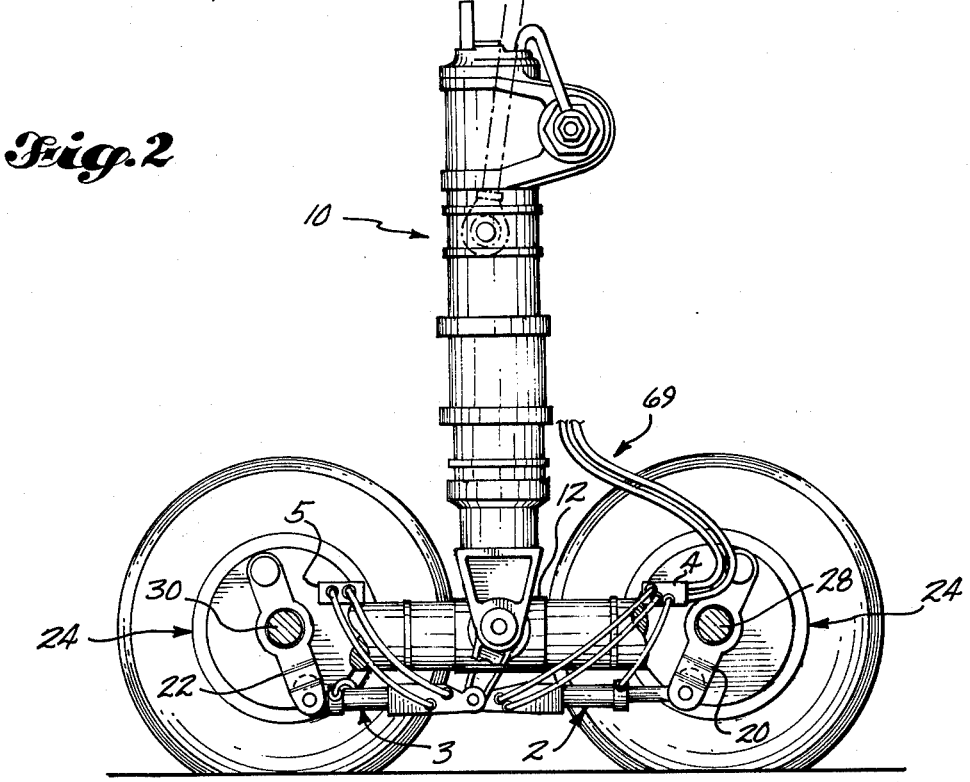
FIG. 2 is a fragmentary perspective view of a four-wheel bogie type landing gear such as one of those on a Boeing 747 aircraft equipped with the present invention.
Figure 7:
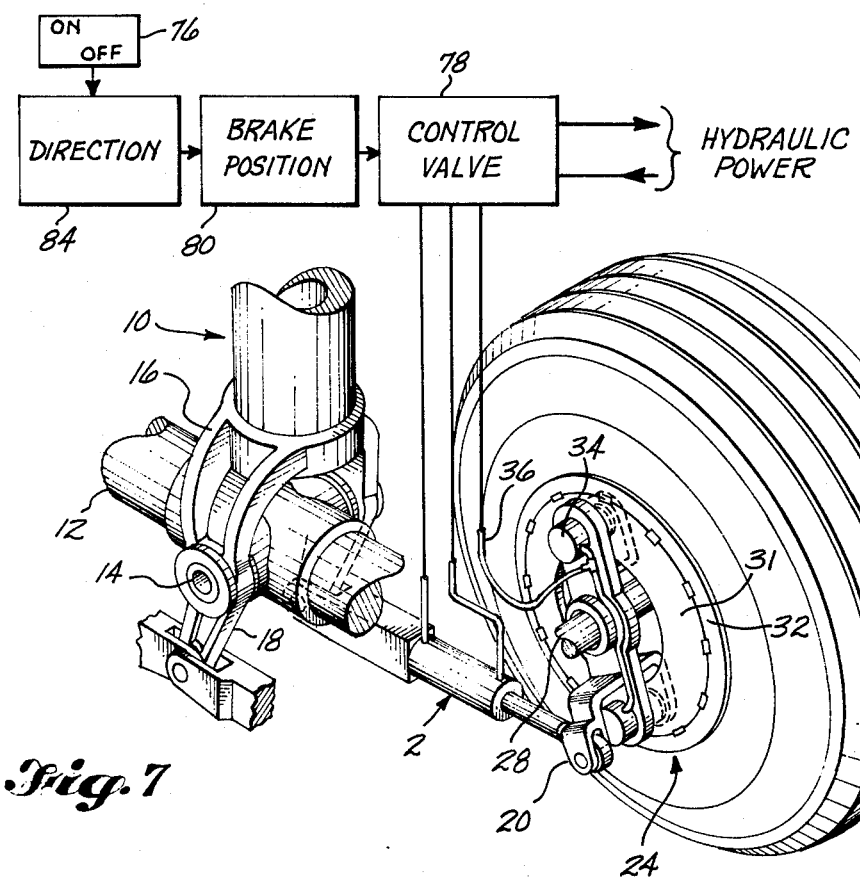
FIG. 7 is a fragmentary perspective view of the left forward wheel of the bogie unit of FIG. 2 with the associated hydraulic actuator in an extended position together with a simplified schematic block diagram of the wheel drive hydraulic control system.
Figure 8:
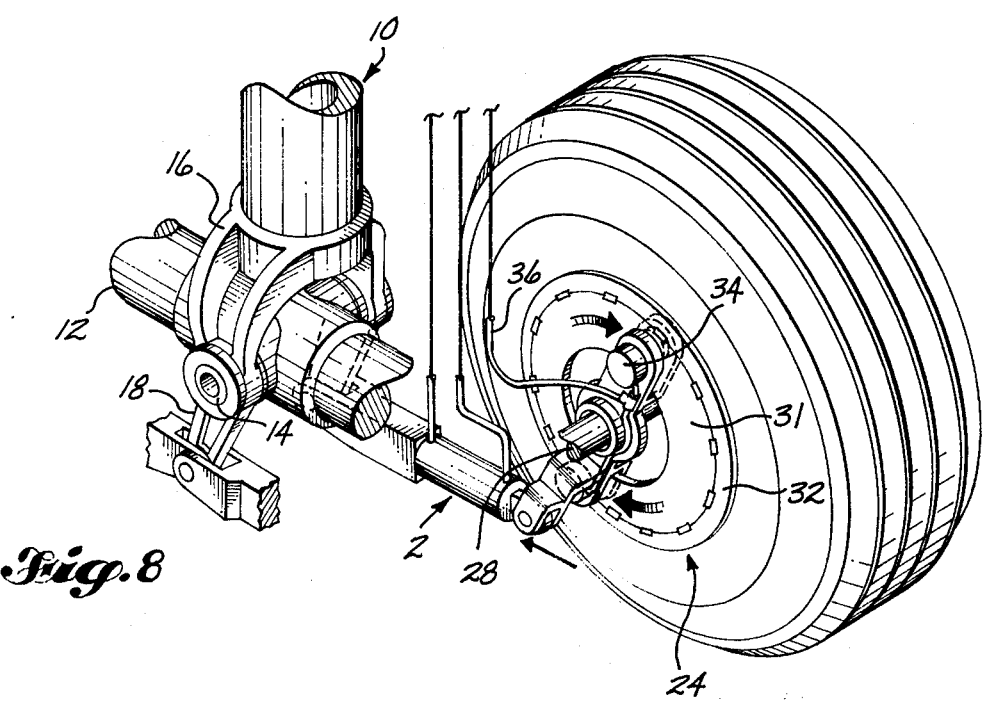
FIG. 8 is a fragmentary perspective view similar to FIG. 7 of the hydraulic actuator being contracted while the wheel brake is applied.

In FIGS. 2, 7 and 8, wherein like parts bear like reference numerals, a typical four-wheel bogie truck-type landing gear unit is depicted. A Boeing 747 airplane, for example, will have four such units. It should be understood, however, that the principles of the invention may be applied to the landing wheels of any airplane or ground vehicle having wheel brakes that can be controlled in a manner coordinated with other portions of the wheel drive mechanism of this invention and that they may be applied to any number of wheels on the airplane. In the referenced figures, the conventional compensator rods (not shown) which transmit the brake torque to the shock strut with no tilt influence being applied to the truck beam and which prevent rotation of the individual brake assemblies during normal braking operation in the illustrated type of bogie have been replaced by double-acting reciprocative hydraulic actuators or jacks, one for each wheel brake assembly. Actuators 2 and 3 apply to the fore and aft left side wheel brake assemblies. The right side fore and aft wheels and brake assemblies (not shown) have similar actuators (also not shown). Fore and aft valve packages 4 and 5 house the wheel drive control apparatus. In normal use of the wheel brakes, the respective actuators serve as rigid links and thereby function as the usual compensator rods they replace, but in the drive mode of operation of the system of this invention have a unique additional function to be described. In the illustrative case of the Boeing 747 airplane, there are four such landing gear bogies, two stowed in the wings and two stowed in the body, each including two pairs of fore and aft wheels mounted on common axles by separate wheel bearings which permit individual rotation of each wheel. While all four wheels may be used for wheel drive purposes, it is deemed sufficient to apply the drive system to just the wheels of the body-mounted bogies. Moreover, the nose gear also is adaptable for wheel drive purposes, but is normally not fitted with brakes with free rotating housings.

The illustrated landing gear includes a main leg or shock strut 10 retractively mounted in the airplane body by means not shown, and pivotally connected at its lower end to a midpoint on a generally horizontal landing gear truck beam 12 by means of a yoke 16 and transverse connecting pivot pins 14. Downward extending torque reaction arms 18 of the yoke provide a pivotal support for the commonly connected ends of actuators 2 and 3 beneath the strut 10. The opposite or outer ends of these actuators are pivotally connected to radial control arms 20 and 22 on the respective brake assemblies 24. The right side actuators and their wheel brake counterparts are similarly connected to the yoke extension 18. Each wheel brake assembly 24 is mounted to rotate freely about the wheel axis defined by shaft, 28 and 30, respectively, and would do so except for restraint against rotation, and for torque producing rotations, provided or caused by the cranking action of the actuator connected to the brake control arms 20 and 22. Such brake assembly 24 typically includes a stack of rotatively movable disc shaped rotors 31 keyed to the wheel 32 and a stack of stationary disc shaped stators (not shown) interspaced between the rotors 31 and connected to the control arm 20. These discs are axially compressible by hydraulic brake energizers 34 controlled by hydraulic pressure through line 36. Such brake systems and the control means for operating them are or may be conventional, as is the mounting of the brake assemblies.

Figure 1:
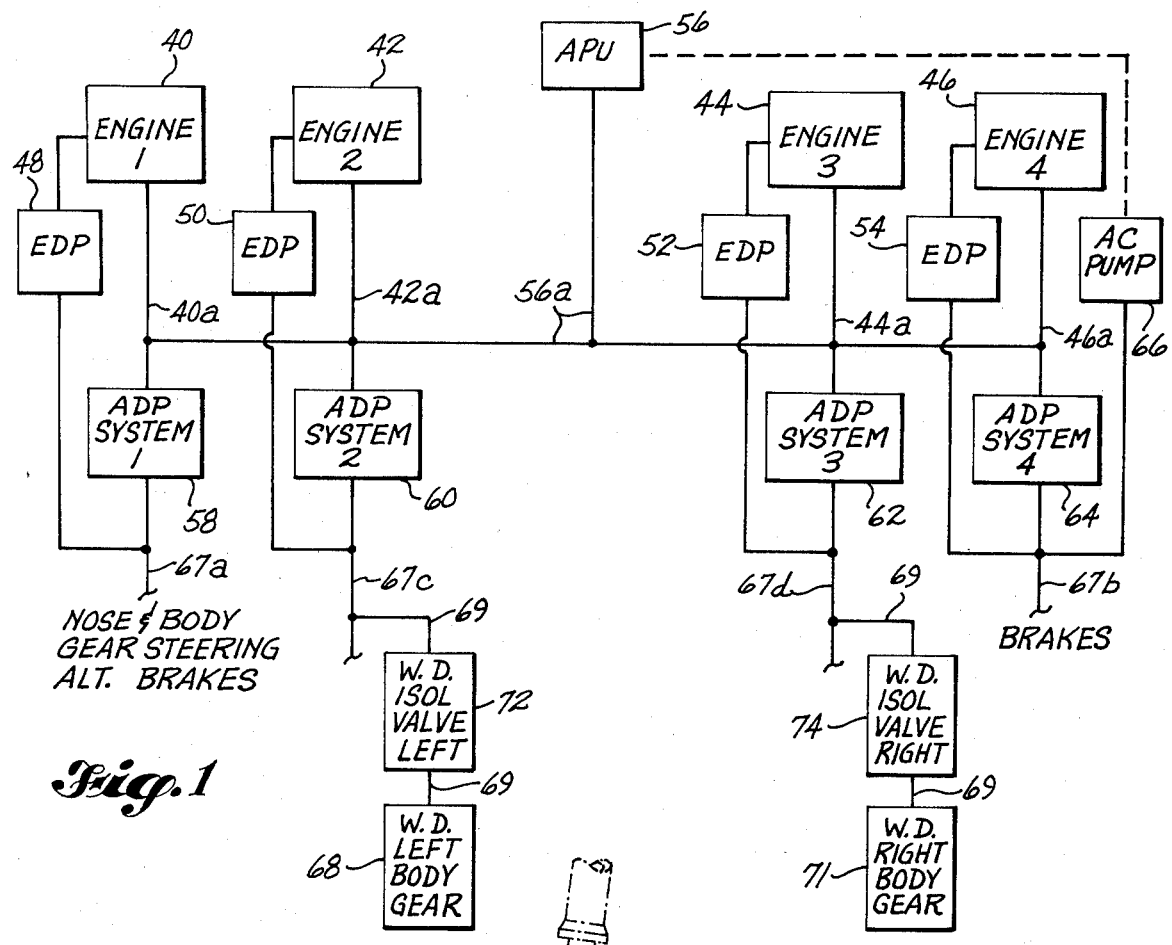
FIG. 1 is a schematic block diagram of an aircraft which supplies hydraulic power to the hydraulic brakes and the wheel drive actuators of the present invention.

FIG. 1 depicts in simplified block diagram form a typical aircraft hydraulic pressure supply system (as installed in the Boeing 747 airplane) adapted with isolating valves to energize the present hydraulic drive system while providing failsafe operation for the conventional brake system which it also energizes. Thus, the four main engines 40, 42, 44 and 46 mechanically drive respective hydraulic pumps 48, 50, 52 and 54. These are the primary hydraulic pressure sources. An onboard auxiliary power unit 56 through air lines 56a also provides bleed air to drive air driven auxiliary hydraulic pumps 58, 60, 62 and 64. These same air driven pumps are also driven by bleed air from the main engines through air lines 40a, 42a, 44a and 46a. For ground operation in the event one or all main engines are not operating and the auxiliary power unit 56 is not operating, an electrically driven hydraulic pump 66 is available to supply pressure fluid to operate the brake system. These same hydraulic pressure sources or selected combinations of them may also be used to operate the wheel drive system of the present invention and to do so in such manner as to minimize fuel consumption and consequent generation of environmental pollutants. For example, one main engine operating at idling speed supplementing power from auxiliary power unit 56 will normally be sufficient to drive the aircraft by means of the invention in moving it about on a terminal apron at a practical ground speed.

As seen in FIGS. 1 and 2 hydraulic pressure line 67a is connected to energize the nose and body gear steering mechanism and as an alternative or back-up supply to the hydraulic brakes. Pressure lines 67b–d are connected to energize the brakes. Hydraulic lines 69 branch off from lines 67c and 67d and are connected to the respective wheel drive systems of the left body gear 68 and right body gear 71, these lines extending respectively through isolating valves 72 and 74. The latter are opened during and to permit operation of the wheel drive system. Being closed at all other times, these valves prevent failures or leakage occurring in the hydraulic systems of the wheel drive systems from impairing operation of the aircraft hydraulic systems.

As will be appreciated, details of the basis hydraulic power sources used to energize the brakes and the wheel drive system of this invention are not critical and may vary from case to case depending upon design preference or other factors.

Figure 3:
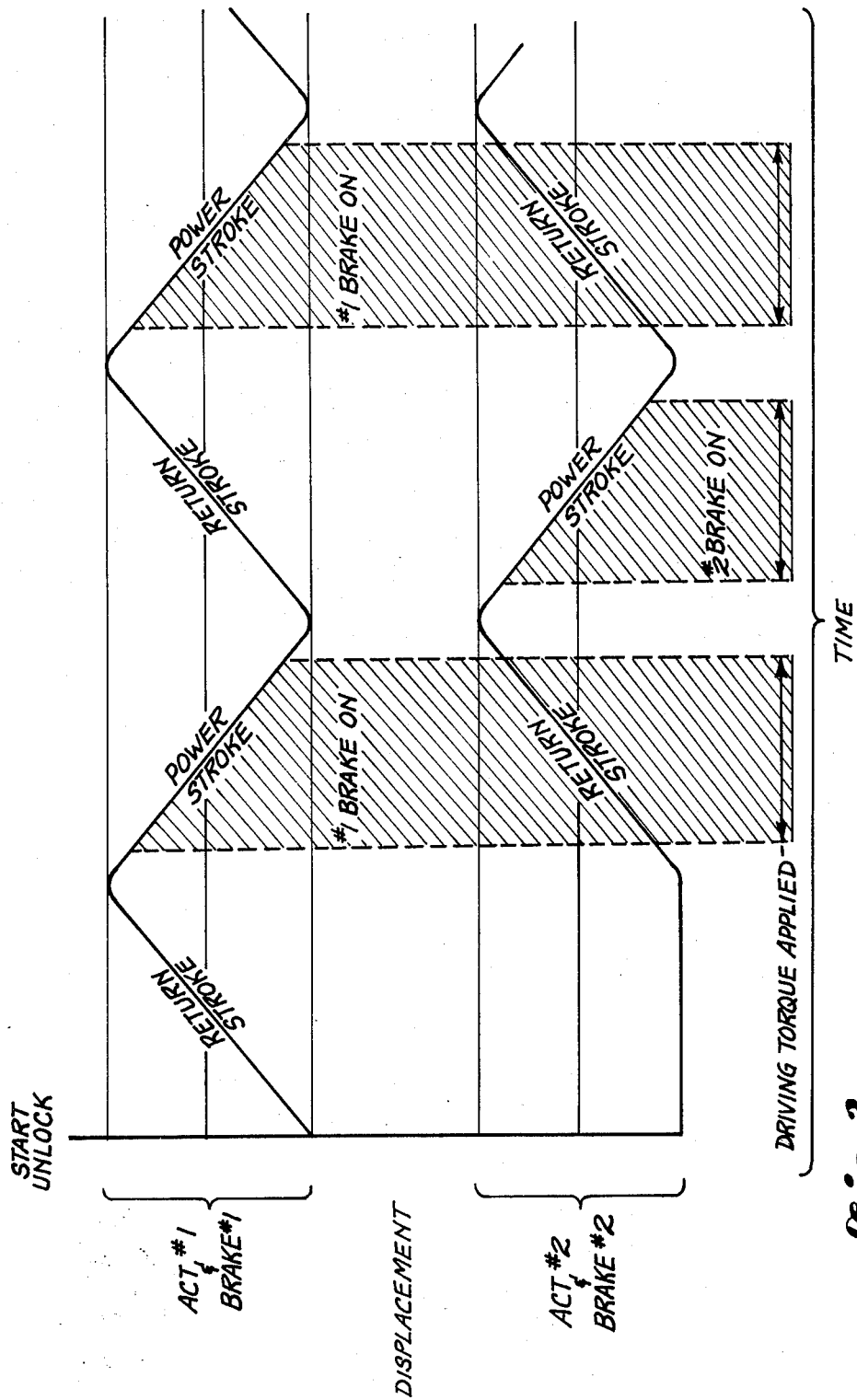
FIG. 3 is a graph of displacement of a cooperating pair of hydraulic actuators as a function of operating condition of the associated wheel brakes and resultant driving torque produced over a succession of operating cycles of the wheel drive.

Operationally, the onboard wheel drive of the present invention applies motor power to one or more wheels of the airplane by cyclical reciprocation of the drive actuator(s) such as 2, 3, etc., accompanied by automatic application of the associated wheel brake(s) selectively in one direction of actuator motion or the other, depending upon whether the aircraft is to be moved backward or forward. When, as in the illustration, there are two or more actuators and associated wheel brakes, greater continuity of driving effort may be achieved than with a single actuator and associated brake assembly. Such increase torque continuity is provided by effecting relative phase displacement of the drive and return strokes of the respective actuators. As is depicted in FIG. 3, for example, two cooperating actuators and associated brakes are operated in direct phase opposition. Thus there are two torque impulses for each cycle of actuator reciprocation. It will be evident that with three actuators 120° phasing may be used; with four, quadrature phasing is permitted, etc. The use of multi-phased drive systems according to this invention and the particular choice of phasing will depend upon the economic and practical trade-offs of system complexity and cost for smoothness of driving torque achieved. For most practical cases, as in that illustrated, opposed phasing of double acting pairs of actuators and brakes offers sufficient torque continuity for sustained driving effort and can be achieved economically and simply with very minor modifications in existing landing gears. It will also be recognized that length of actuator stroke and actuator recycling frequency also affect smoothness and speed of the driving effort achieved, and represent additional design parameters available in application of the invention to practical cases.

The hydraulic actuators may be operated in cooperating pairs arranged fore and aft as in the case of actuators 2 and 3 in FIG. 2, for example, or arranged side by side. During drive operation, fore and aft paired actuators are caused to extend and contract simultaneously to produce a step by step driving action while side by side pairs do so alternately. In either arrangement, the wheel drive produces torque about the landing gear strut due to the lateral offset of the wheels about the landing gear strut. However, the stress or repetitive loads imposed upon the landing gear structure during operation of the wheel drive are within landing gear design limits based upon the torsional and fatigue characteristics of landing gear equipped with conventional compensator rods.

It should be noted that the actuators when paired fore and aft require an additional supply of hydraulic fluid to compensate for the fluid lost from the actuator chamber through which the actuator piston rod extends during each cycle of operation; otherwise, there is created an area and volume imbalance arising from the unequal fluid volumes between the two chambers due to displacement of a small amount of hydraulic fluid by the piston rod. Hence, side by side pairing of the actuators is preferred in order to conserve hydraulic fluid and to reduce the complexity of the wheel drive hydraulic control system.

The powered wheel drive also may be adapted for use in propelling other types of land vehicles besides ground-borne aircraft, especially where these vehicles are very large and must be capable of limited self-propelled movement without the use of their main propulsion engines in their normal propulsive operating mode. Such land vehicles need not be equipped with wheels, moreover, because the hydraulic actuators may operate with any rotative part of the vehicle tractive apparatus; for example, they may be adapted to rotate the cogged driving sprocket at each end of a continuous metal belt used to propel a caterpillar vehicle.

By driving the bogie wheel brake assembly actuators on one side of the airplane while their counterparts on the opposite side are not being driven, or are being driven at a different effective speed, or are being braked, the aircraft obviously can be steered while in motion.

Returning to FIG. 3, coordination of displacement of a typical cooperating pair of hydraulic actuators with application of the associated wheel brakes is depicted on a time-function graph. During drive operation, the paired actuators are caused to extend and contract simultaneously, or alternately. In the case of fore and aft paired actuators 2 and 3 in FIG. 2, for example, simultaneous extension of actuators 2 and 3 rotate their respective crank arms 20 and 22 in opposite directions. During that phase, the brake of one of the associated wheels is applied while that of the other is released, depending upon the desired direction of aircraft motion. When the actuators are contracted on the succeeding half cycle, swinging the respective crank arms oppositely, the roles of the brakes are reversed, that previously applied now being released and that previously released now being applied, thereby continuing the motion of the aircraft in the same direction. The cycle is repeated as long as desired in order to sustain the wheel drive. In the case of side by side paired actuators, however, one actuator is caused to extend while the other actuator is caused simultaneously therewith to contract.

In a side by side pairing of the forward actuators on the left body gear, the right front hydraulic actuator (not shown) is interconnected with the left front actuator 2 such that as one actuator is caused to contract the exhaust flow therefrom is transmitted to the other actuator which is thereby caused to extend simultaneously.

The wheel drive together with a simplified representation of the hydraulic control system for propelling the aircraft in a forward direction using the left body gear wheel drive is depicted in FIGS. 7 and 8 of the drawings. An on-off control element 76 energizes and unlocks the left body gear wheel drive system in response to a command from the aircraft flight crew. A control valve 78 channels hydraulic power to the left front actuator 2 and releases the left front brake during the return stroke of the left front actuator 2. When the left front actuator reaches an extended position, a brake position control 80 orders the control valve 78 to apply the left front brake and the control valve 78 causes the left front actuator to contract through a power stroke. The left front brake is thereby rotated; but now imparts clockwise torque, as viewed in FIG. 8, to the left front wheel by virtue of the coupling provided by the left front brake between the actuator 2 and the left front wheel. The exhaust flow from the left front actuator 2 during its power stroke is fed to the right front actuator which is thereby caused to extend simultaneously therewith through a return stroke without the transmission of torque because the right front brake (not shown) is off. At the end of the power stroke of the left front actuator 2, the brake position control 80 orders the control valve 78 to release the left front brake 24 and to apply the right front brake. The control valve 78 then causes contraction of the right front actuator through a power stroke while simultaneously therewith the left front actuator is caused to extend through a return stroke.

In the event the aircraft is to be driven in a reverse direction, alternate energization of the left and right brakes in coordination with movement of their respectively associated actuators is reversed by a direction control 84. The control valve 78 and brake position control 80 function in the same manner as when the aircraft is driven in a forward direction; but the direction control 84 crosses the signals from the brake position control 80 whereby the right brake is applied instead of the left brake. Thus, as the right actuator is extended through a return stroke, for example, by the exhaust flow generated by the power stroke of the left actuator 2, as discussed above, the right wheel now experiences a counter-clockwise torque, exerted through the coupling between the right actuator and the right wheel provided by the right brake while the left front wheel experiences no torque. Another way to propel the aircraft in the reverse direction, however, is to reverse the actuator circuit through the control valve 78 instead of crossing the brake commands from the brake position control 80.

Figure 4:
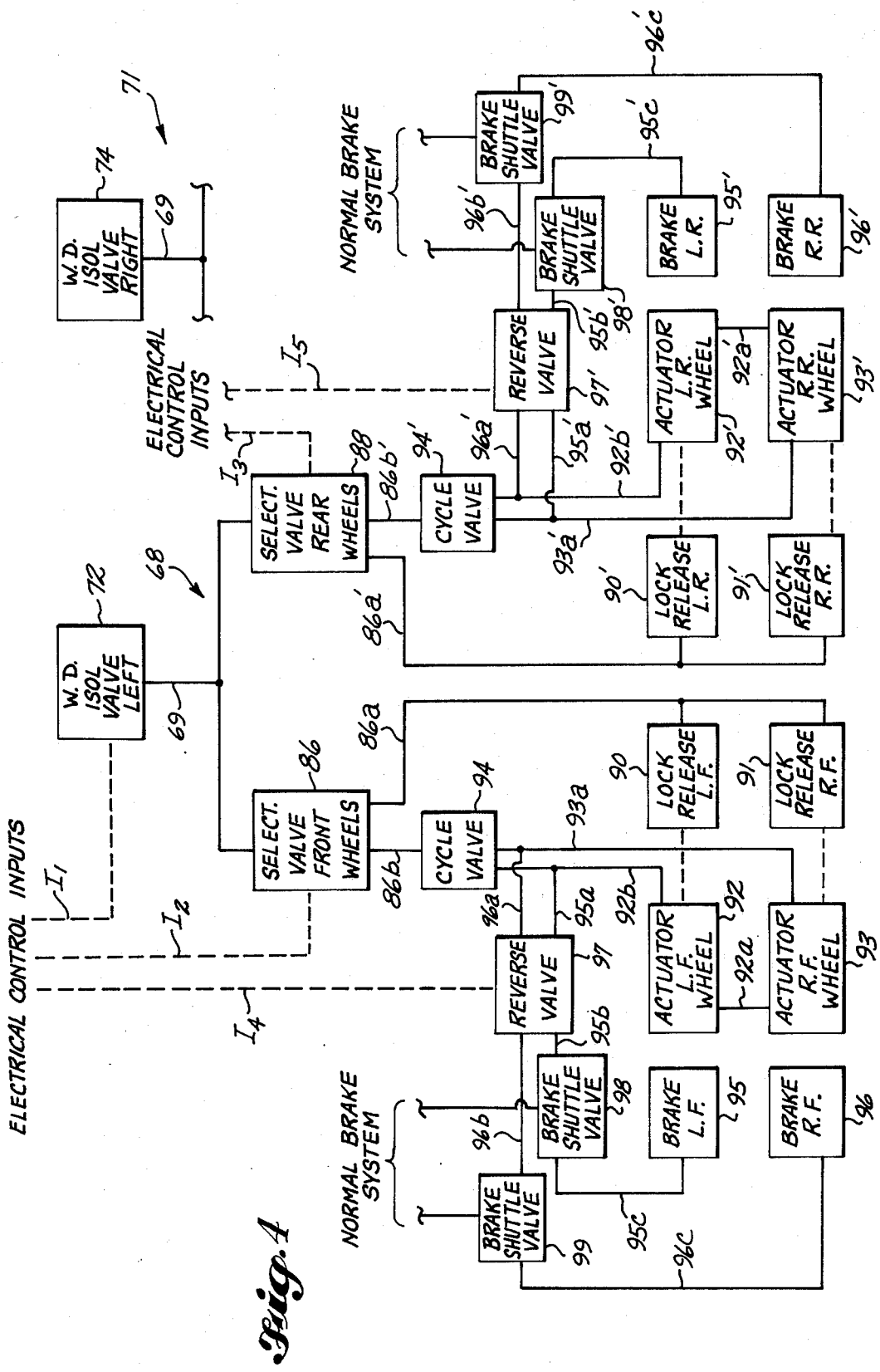
FIG. 4 is a schematic block diagram of the hydraulic control system for the wheel drive associated with a four-wheel bogie such as that shown in FIG. 2.

The control system for effecting cyclic operation of the paired actuators and phasing of the application of the brakes in accordance with the desired direction of travel may be understood with reference to FIG. 4 in which is shown a schematic block diagram of the left and right body gear wheel drive hydraulic systems, which are generally designated 68 and 71 in FIG. 1. The illustrated systems are operable for side by side cooperation of fore and aft pairs of actuators. The right wheel drive hydraulic control system 71 is not shown in FIG. 4 beyond the truncated connections emanating from the right wheel drive isolation valve 74, it being understood that the detailed description herein of the left wheel drive hydraulic control system is identical to that of the right wheel drive control system.

The hydraulic control system for the left body gear wheel drive is under the direct control of the flight crew in the form of five electrical control inputs. The first of the inputs, $I_1$ is to the left wheel drive normally closed isolation valve 72, which is thereby opened to supply hydraulic pressure fluid from the aircraft power system to the left body gear wheel drive system 68 through hydraulic pressure line 69.

The second and third inputs $I_2$ and $I_3$ are to a pair of normally closed selector valves 86 and 88 which control the supply of hydraulic pressure fluid to the front and rear pairs of bogie wheels, respectively. It can be seen from FIG. 4 that the hydraulic control systems for the front and rear pairs of bogie wheels are identical. Accordingly, only the hydraulic control system for the front wheel pair is described with reference numerals herein, corresponding elements of the rear wheel pair control system being designated with the same reference numerals primed.

When the left wheel drive isolation valve 72 and the front wheel selector valve 86 are opened in response to inputs $I_1$ and $I_2$, the forward wheel pair control system is supplied with hydraulic power from the aircraft power system through hydraulic line 86b. In addition, opening of the front wheel selector valve 86 supplies hydraulic pressure fluid through hydraulic line 86a to actuate a pair of lock releases 90 and 91 on the left and right front wheel actuators 92 and 93, respectively. All of the hydraulic actuators for the wheel drive system are internally locked against change of length when not in use so that they function mechanically during these intervals in the same fashion as the compensator rods which they replaced.

A two-position cycle valve 94 coordinates movement of the left and right front actuators 92 and 93 with the application of the left and right front brakes 95 and 96. The left and right front brakes 95 and 96 are respectively connected to the cycle valve 94 through hydraulic lines 95c and 96c, shuttle valves 98 and 99, hydraulic lines 95b and 96b, a reverse valve 97 and hydraulic lines 95a and 96a. The fore and aft wheel pair reverse valves 97 and 97' are actuated by electronic control inputs $I_4$ and $I_5$.

The fore and aft pairs of actuators and respectively associated brakes are operated by supplying hydraulic pressure fluid to the right actuator 93 through hydraulic line 93a while simultaneously energizing therewith the right brake 96 through hydraulic lines 96a–c. The exhaust flow from the right actuator 93 is transmitted through hydraulic line 92a to the left actuator 92. The respective directions of displacements of the left and right actuators alternatively are reversed by supplying hydraulic pressure fluid through hydraulic line 92b to the left actuator 92 and transmitting the exhaust flow therefrom to the right actuator 93 through the interconnecting hydraulic line 92a. Continuity of driving effort is achieved by simultaneously energizing therewith the left brake 95 through the hydraulic lines 95a–c. In the event the aircraft is to be propelled in a reverse direction, the reverse valve 97 causes the hydraulic lines 95a and 96a to instead communicate with hydraulic lines 96b and 95b so as to energize, respectively, the left and right front brakes during movement of the right and left front actuators. Since the actuator power strokes have changed phase relationship to application of the brakes, the exhaust flow from the first, now unloaded actuator, becomes the power source for the second actuator.

Conventional operation of the aircraft brakes is permitted by the brake shuttle valves which allow alternative energization of the left and right front brakes by the wheel drive or simultaneous normal operation by the aircraft hydraulic systems. Hence, among brakes of the typical powered bogie, some brakes may be operated by the normal brake system in their braking mode while simultaneously therewith other brakes on the same bogie, for example, may be operated by the wheel drive hydraulic system in their driving mode.

Additional flexibility of the wheel drive system is provided by the use of separate selector valves for the front and rear wheel pairs. Both selector valves 86 and 88 are opened to power all four wheels under high torque, low speed operating conditions involved in overcoming breakaway forces and initially moving the aircraft in the vicinity of the terminal. Only the front selector valve 86, however, is opened at the low torque conditions involved in maneuvering and taxiing the aircraft. The forward wheel pair is preferably powered at the low torque condition because the truck has greater stability when pulled along the direction of travel.

Figure 5:
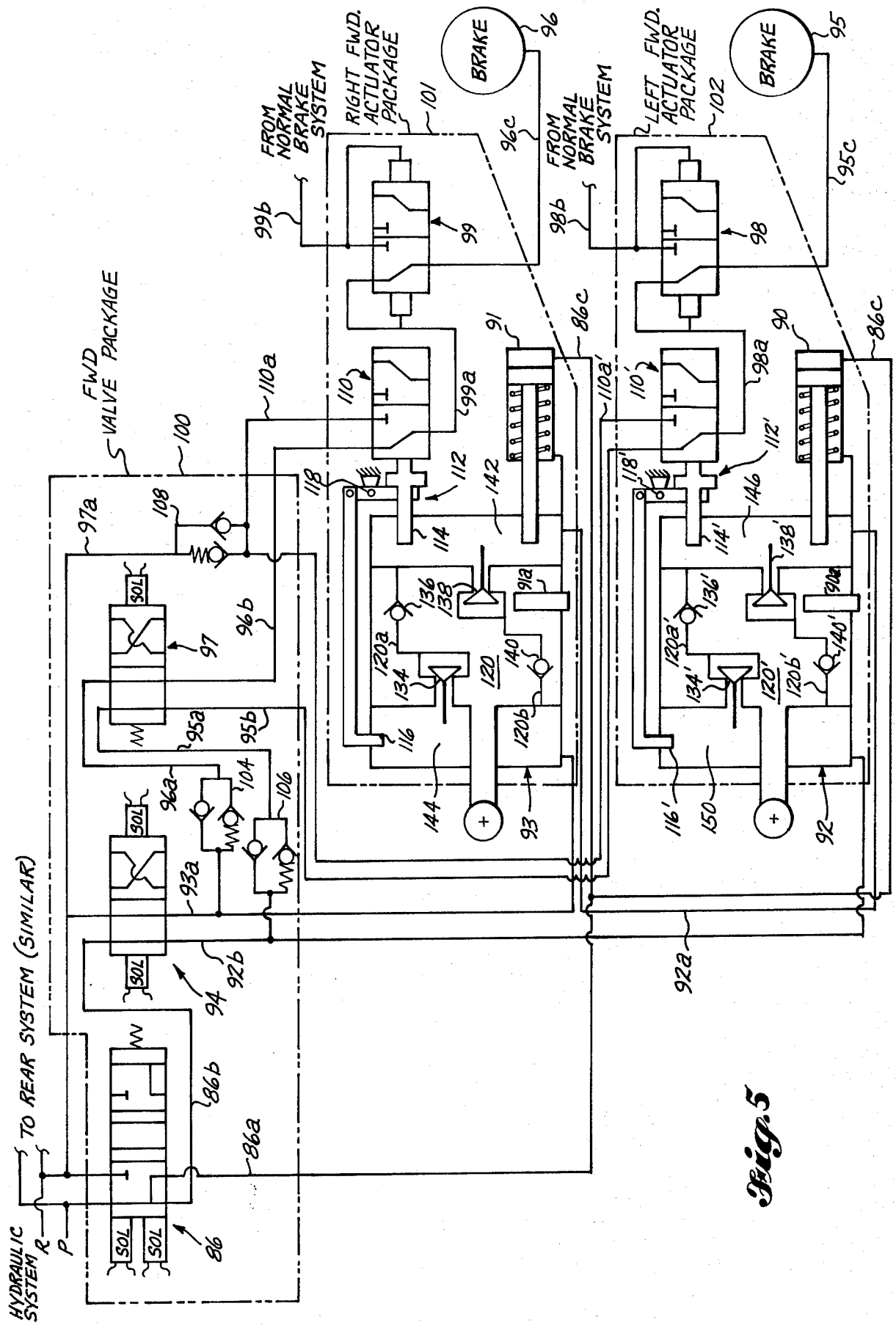
FIG. 5 is a schematic diagram of an open loop hydraulic system for the forward wheel hydraulic actuators and brakes of a bogie unit incorporating the invention.
Figure 6:
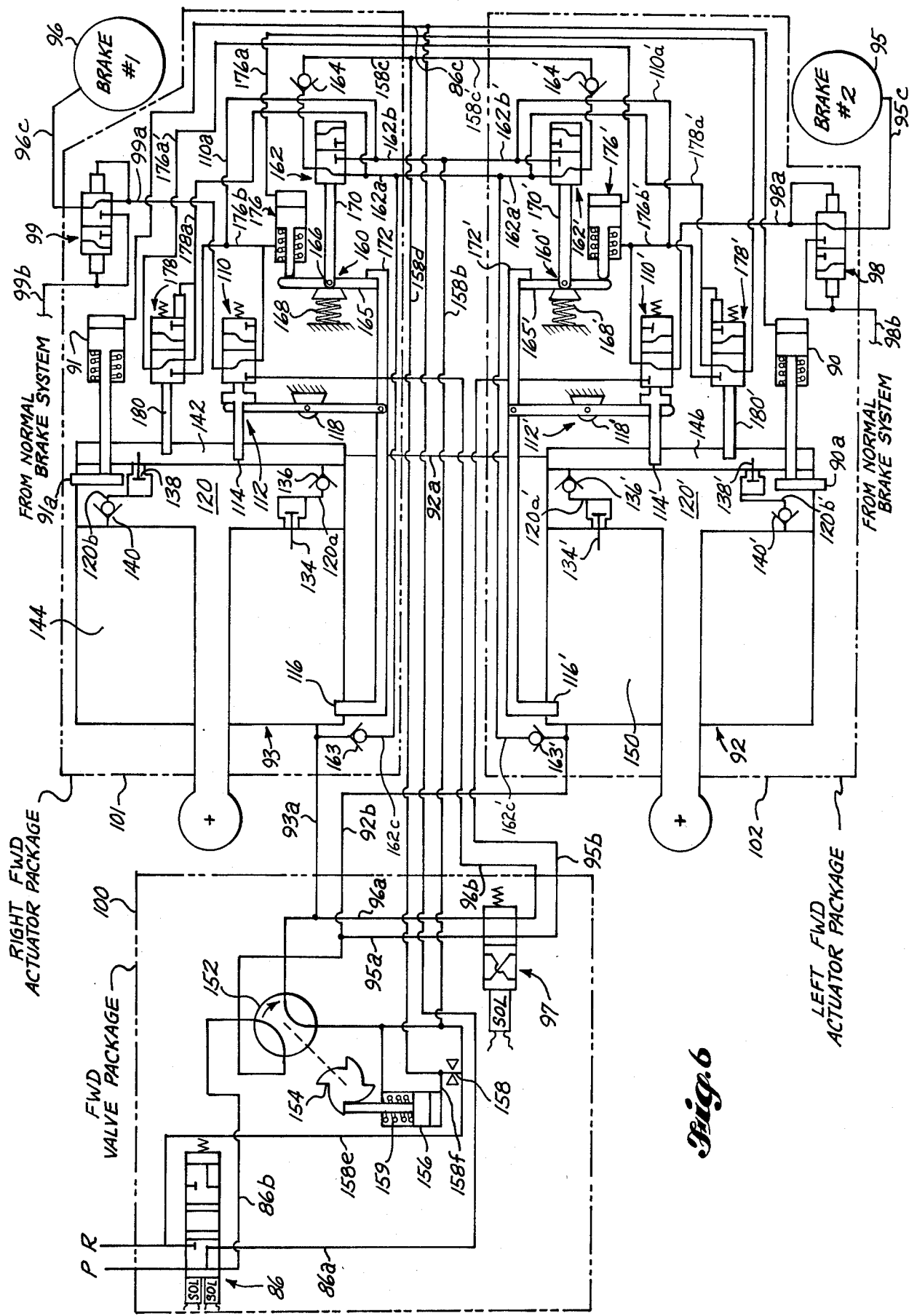
FIG. 6 is a circuit diagram of a closed loop hydraulic system the purpose of which is similar to the system of FIG. 5.

In FIGS. 5 and 6 there are shown two hydraulic control circuits which include specific components exemplifying those generally represented in FIG. 4 and wherein like parts bear like reference numerals. For illustrative purposes, operation of these systems will be described with reference to the side by side pairing of the forward actuators of the left body gear, although the systems so described also may be employed on other landing gear and in other functional pairings. It is to be emphasized, moreover, that other configurations and types of control systems also may be employed within the scope of the present invention and that details of circuitry illustrated in FIGS. 5 and 6 are not essential to the practice of the present invention.

For purposes of clarity and understanding, the fore and aft actuators, designated with reference numerals 2 and 3 in FIG. 2, are represented in FIGS. 5 and 6 schematically by broken line enclosures. It can be seen that these schematic representations depict control elements in addition to a double-acting reciprocative hydraulic actuator within each enclosure. Accordingly, the left and right actuator packages together with the reciprocative actuators respectively housed therein are illustrated and described hereinafter using different reference numerals. Similarly, the forward valve package designated with reference numeral 4 in FIG. 2 is schematically depicted in FIGS. 5 and 6 by a broken line enclosure and also is designated hereinafter with a different reference numeral.

The forward valve package 100 houses three control valves: selector valve 86, cycling valve 94 and reversing valve 97. The selector valve 86 is a three position, four port, solenoid and spring offset valve for actuating lock releases 90 and 91 which are comprised of a pair of unidirectional cylindners to release locks 90a and 91a in the left and right forward actuators 92 and 93, respectively. The selector valve 86 also provides hydraulic pressure fluid P to the forward actuators 92 and 93. The selector valve 86 operates between three positions illustrated by the three adjacent envelopes representing each position. In the solenoid operated first position as illustrated with port lines 86a and 86b connected thereto, pressure fluid P is transmitted to the cycling valve 94 through line 86b and to the lock release cylinders 90 and 91 through line 86a and branch lines 86c while the system return R is blocked. In this position, the condition of the locks 90a and 91a remain unchanged. In the solenoid operated second, or middle position as illustrated, pressure fluid P again is transmitted to the cycling valve as in the first position; but line 86a and the branch lines 86c are opened to the system return R whereby the forward lock release cylinders 90 and 91 are moved to their locked positions, allowing the actuator locks to "latch in" prior to de-energization of the system. In the spring operated third position, the port exposed to pressure fluid P is blocked and both port lines 86a and 86b are connected with the system return R. In the latter position, the wheel drive is de-energized and both forward locks 90a and 91a are locked. The solenoids for operating the selector valve between the two solenoid operated positions are controlled by the aforementioned electrical control input $I_2$ (not shown in FIG. 5).

The cycling valve 94 is a two position, four port, solenoid controlled valve operable between a solenoid operated first position illustrated with port lines 92b and 93a connected thereto wherein pressure fluid P is transmitted directly to the left actuator forward chamber 150 through line 92b and a solenoid operated second position wherein pressure fluid P is transmitted directly to the right actuator forward chamber 144 through line 93a. The solenoids are alternately actuated by an external signal pulse generator (not shown) to periodically shift the cycling valve between the two positions illustrated.

The reversing valve 97 is a two position, four port, solenoid controlled valve illustrated in the forward driving mode position with port lines 95a and 96a connected thereto. These lines respectively branch from lines 92b and 93a and communicate with port lines 95b and 96b to the left and right brakes. In the solenoid operated second position, the connections of the port lines 95a,b and 96a,b are reversed. The solenoid actuator of the reversinsg valve 97 is subject to the aforementioned electrical control input $I_4$ (also not shown in FIG. 5).

The forward valve package 100 also includes a plurality of back pressure valve assemblies 104, 106, and 108 disposed in lines 95a, 96a, and 97a to and from the left and right brakes 95 and 96 for the purpose of maintaining a constant low pressure bias on the brake stack of each brake whereby without causing undue drag and wear, take-up slack is eliminated such that application of brake energizing pressure will produce immediate brake response. This is especially important for efficient wheel drive by means of the novel system, as thereby complete brake filling is not required for each cycle.

Since both the right and left forward actuator packages 101 and 102 include identical elements, only the right actuator package 101 will be described in detail herein, with corresponding elements in the left actuator package 102 being designated with similar numerals primed.

A brake depressurization valve 110 is a two position, three port, mechanically offset valve for depressurizing the right brake 96 when the right actuator 93 approaches either end of its stroke so as to prevent damage to the wheel drive due to inertia slamminng of the actuator. The brake depressurization valve 110 is illustrated with port lines 110a, 96b and 99a connected to the position assumed during the actuator mid-stroke wherein hydraulic pressure fluid P is supplied from the port line 96b (when valves 94 and 97 so employ it) to port line 99a while the system return R through port line 110a is blocked. The brake depressurization valve is moved to the second position represented by the right-hand envelope, as shown, by a mechanical actuator assembly 112 including a pair of feeler elements 114 and 116 pivotably mounted about a common fulcrum 118 for respectively sensing whether the right actuator 93 is completely extended or contracted. Preferably, the mechanical feeler elements 114 and 116 actuate the brake depressurization valve when the actuator approaches 0.3 inches or less to the end of its stroke. The mechanically actuated second position of the brake depressurization valve blocks hydraulic pressure fluid P through the port line 96b while opening the port line 110a to the system return R to depressurize the right brake 96.

The aforementioned right brake shuttle valve 99 is a two position, three port, pressure operated valve for by-passing the wheel drive hydraulic system to permit energization of the right brake 96 by the conventional aircraft brake hydraulic system independently of the wheel drive control system. In the first position of the right brake shuttle valve illustrated with input port lines 99a and 99b connected thereto, hydraulic pressure fluid P is transmitted from the wheel drive hydraulic system through line 99a to energize the right brake 96 through line 96c while the port line 99b from the normal brake system is blocked. The second position of the brake shuttle valve represented by the right-hand envelope, as shown, blocks the input port line 99a from the wheel drive and instead opens the normal brake system input port line 99b so as to permit energization of the right brake 96 by the normal brake system. The shuttle valve is bistable in operation in that it remains at its last position until pressure in the blocked input line increases in response to attempted brake actuation by the wheel drive or normal brake systems, and is a commonly used element in conventional aircraft brake systems.

The left and right actuators 92 and 93 include pistons 120 and 120', each of which is provided with a pair of by-pass conduits which are controlled by position responsive valves. The right actuator piston 120 is provided with a rear-to-front by-pass conduit 120a having a forward end responsive by-pass valve 134 and a rear-to-front one-way valve 136. The piston also is provided with a front-to-rear by-pass 120b conduit having a rear end responsive by-pass valve 138 and a front-to-rear one-way valve 140. It can be seen that each by-pass conduit is operable only when its end responsive by-pass valve is in the open position due to the actuator 93 being extended or contracted, and when pressure is exerted within the cylinder chamber opposite the open end responsive valve.

The by-pass conduits in the right and left actuator pistons are necessary in the event both actuators take up identical positions. For example, if both actuators initially are contracted, there is no exhaust flow between the rear chamber 142 of the right actuator and the rear chamber 146 of the left actuator across the interconnecting conduit 92a to produce simultaneous opposing displacements of the left and right actuators. The by-pass conduits eliminate this condition by establishing a low resistance fluid path through one of the pistons and the interconnecting conduit to the rear chamber of the other actuator which is thereby extended. The arrangement facilitates initiating cycling and relocking when de-energizing the system.

The closed loop system shown in FIG. 6 features automatic cycle reversal when both actuators reach opposite ends of their strokes. Unlike the open loop system cycle reversal takes place in the closed loop system only following a full stroke by both actuators. The closed loop system includes the same valve elements as the aforementioned open loop system with the exception that the cycling valve of the closed loop system, instead of being pulsed at a given rate, changes positions in response to both actuators completing a full stroke. Accordingly, the elements in the closed loop system which correspond to the elements already described in connection with the aforementioned open loop system are designated with like reference numerals and are not further described except as necessary to understand the operation of the closed loop system.

The closed loop system cycling valve includes a circular valve member 152 which is rotated by a ratchet 154 and a unidirectional cylinder 156. The position of the cycling valve element 152 is changed by actuating the cylinder 156 when both actuating pistons have completed a full stroke by momentarily increasing the fluid pressure in an input line 158d. A restrictive orifice 158 between input line 158d and exhaust line 158e forces pressure fluid from input line 158d through branch line 158f into the pressure chamber associated with cylinder 156 which is thus extended toward engagement with ratchet 154. The cylinder 156 is reset or moved to its contracted position by a spring 159 as pressure fluid thereafter slowly exits from cylinder 156 through branch line 158f and the restrictive orifice 158 to the exhaust line 158e and the system return R.

Since both the right and left actuator packages 101 and 102 include identical elements, only the right actuator package 101 is described with reference numerals, corresponding elements in the left package 102 being designated with like reference numerals primed.

The right actuator package 101 includes an AND summing element generally designated 160 for operating a pilot valve 162 which controls the fluid pressure in the input line 158d. The pilot valve 162 is a two position, three port, mechanically operated input illustrated in the mechanically operated position represented by the left envelope, as shown, with pressure fluid line 162a and return line 162b connected thereto. The mechanically operated position is achieved through mechanical actuation by the AND summing element described more fully herein. The neutral position of the pilot valve is represented by the righthand envelope, as shown. The direction of flow through the pilot valve 162 is regulated by a pair of one-way valves 163 and 164 respectively disposed on each side of the pilot valve in the port lines 162c and 158c.

The preferred AND summing element is a summing bar 165 pivotally supported about a central fulcrum 166 which is mounted for longitudinal movement against the bias of a supporting spring 168. Either end of the right actuator package summing bar is respectively displaced by mechanical control actuators to be described herein in response to complete contraction of the left actuator and complete extension of the right actuator. In a similar manner, the left actuator package summing bar 161 is responsive to the opposite condition, namely respective extension and contraction of the left and right actuators. The AND summing function is performed by the supporting spring 168 which is strong enough to prevent longitudinal displacement of the summing bar fulcrum 166 unless both ends of the summing bar are displaced simultaneously, together with a linkage 170 connecting the summing fulcrum 166 with the pilot valve 162.

Displacement of the one end of the summing bar 165 is effected by a rearward extension 172 of the mechanical actuator assembly 112. The opposite end of the summing bar 165 is displaced by a single-acting cylinder 176 which is actuated by a head-end pilot valve 178' in the left actuator package, which valve is responsive to complete contraction of the left actuator. In a similar manner, the right head-end pilot valve actuates a similar double-acting cylinder 176' in the left actuator package AND summing mechanism. The right and left cylinders 176 and 176' are disabled during the mid-strokes of their respectively associated actuators by their respective right and left head-end valves.

The right head-end pilot valve 178 is a two position, three port mechanically and spring-pressure offset valve operable between a first mechanically operated position represented by the left-hand envelope, as shown, with port lines 176b, 178a and 176a' connected thereto. This position is achieved when the right actuator is completely contracted and engages a feeler element 180 whereby pressure fluid P is supplied to the rear chamber of the left actuator package cylinder 176' through hydraulic lines 93a, 162a,c, 178a and 176a'. The second position of the head-end pilot valve 178, represented by the right-hand envelope, is the normal spring and pressure operation position of the pilot valve in which line 178a is blocked. Hence, hydraulic pressure fluid P is supplied to the rear chamber of the left cylinder 176' only when the right actuator is contracted and at no other time. In a similar manner, the rear chamber of the right cylinder 176 is supplied with hydraulic pressure fluid P through the hydraulic line 176a only in response to the left actuator being contracted.

The single-acting cylinder 176 is provided with a biasing spring for normally maintaining the cylinder in a retracted position not displacing the end of the summing bar 165 operable therewith. The spring bias may be overcome when pressure is increased in the rear chamber of the cylinder in response to total contraction of the left actuator as described. The forward chamber of the cylinder 176 is exposed to the system return R through a vent line 176b and branch line 110a, which in turn is connected by line 162b with the common return line 158b. The forward chamber of the right cylinder 176 is also connected through vent line 176b and line 176a' with the rear chamber of the left cylinder 176' when the right head-end pilot valve 178 assumes the second position thereof, illustrated by the righthand envelope as shown, in response to extension of the right actuator. In a similar manner, the respective forward end rear chambers of the left and right cylinders 176' and 176 are interconnected in order to disable both cylinders at all times except when their respectively associated actuators are contracted.

Extension of cylinder 156 in response to complete extension of the right actuator simultaneously with complete contraction of the left actuator is effected when the pilot valve 162 is mechanically operated from the normal position thereof, represented by the righthand envelope as shown, in which line 158c is connected with line 162b and common return line 158b to the mechanically operated position thereof, represented by the left-hand envelope, as shown. In the latter position, line 158c is opened to hydraulic pressure fluid P through lines 93a, 162c and 162a, which fluid is transmitted along the fluid line 158c to the common input line 158d connected with the restricted orifice 158 and branch line 158f into which the pressure fluid P is forced by the orifice 158 to extend the cylinder 156 into engagement with ratchet 154 which shifts the cycling valve 152 to its next position. The left actuator pilot valve 162' operates in a similar manner to alternately effect actuation of cylinder 156 through the common input line 158d when the left actuator is completely extended simultaneously with complete contraction of the right actuator.

What is claimed is:

1. In a wheeled vehicle, combination driving and braking apparatus comprising rotative brake means selectively actuatable to exert braking effort on vehicle wheel means and deactuatable to free the wheel means of such braking effort, powered reciprocative brake positioning means capable for positioning and moving the brake means rotationally, actuator means selectively operable to actuate the brake means while operating the brake positioning means for movement in one direction to rotate the wheel means and alternately to de-actuate the brake means while operating the brake positioning means for movement in the reverse direction without rotating the wheel means, so as to drive the vehicle, and means for maintaining the brake positioning means stationary while actuating and de-actuating the brake means when braking the vehicle.

2. The apparatus defined in claim 1, wherein the actuator means is further alternatively operable to actuate the brake means while operating the brake positioning means for movement in the reverse direction, and alternately to de-actuate the brake means while operating the brake positioning means for movement in the one direction.

3. The apparatus defined in claim 1, including a second rotative brake means selectively actuatable to exert braking effort on the vehicle wheel means and de-actuatable to free the wheel means of such braking effort, and a second powered reciprocative brake positioning means operable for positioning and moving the second brake means rotationally, and wherein the actuator means are selectively operable to actuate the first-mentioned and second brake means in alternate sequence while simultaneously operating therewith their respectively associated brake positioning means, whereby the wheel means are rotated by increments alternately by the two brake means and respectively associated powered reciprocative brake positioning means.

4. The apparatus defined in claim 3, including interconnecting means between the first-mentioned and second powered reciprocative brake positioning means operable simultaneously with movement of the first-mentioned brake positioning means in one direction for moving the second brake positioning means in the reverse direction and wherein the actuator means are selectively operable to first actuate one or the other of the brake means depending upon the desired direction of rotation of the wheel means.

5. Combined self-motivating and braking apparatus for a ground-borne vehicle including a traction drive system having at least one rotative drive element, the apparatus comprising brake means selectively actuatable to engage and release the rotative drive element, the brake means having a gripping member rotatively engageable with the drive element so as to rotate conjointly therewith when the brake means are actuated, and actuator means operable to rotatively position and move the gripping member independently of rotative positioning of the rotative drive element, the actuator means being operable selectively to restrain the gripping member against rotation and alternatively to effect rotation thereof in one direction of rotation or the other.

6. In an aircraft having a hydraulic power system for supplying hydraulic pressure fluid, landing gear means including wheels rotatively mounted on the landing gear means, rotative hydraulically powered brake means including brake actuator means connected in the hydraulic system to selectively actuate the brake means to exert braking effort on the aircraft wheels and de-actuate the brake means to free the aircraft wheels of such braking effort, combination driving and braking apparatus comprising:

hydraulically powered reciprocative brake positioning means connected in the hydraulic system for positioning and moving the brake means rotationally;

control means connected in the hydraulic system for selectively operating the brake actuator means to actuate the brake means while operating the brake positioning means for movement in one direction to rotate the wheel means and alternately to de-actuate the brake means while operating the brake positioning means for movement in the reverse direction without rotating the wheel means, so as to drive the aircraft;

valve means for by-passing the control means to permit actuation and de-actuation of the brake means by the brake actuator means independently of the control means; and valve means for selectively isolating the brake positioning means and the control means from the aircraft hydraulic power system and for maintaining the brake positioning means stationary while permitting actuation and de-actuation of the brake means by the brake actuator means, so as to brake the aircraft.

7. The apparatus defined in claim 6 including a second rotative hydraulically powered brake means including brake actuator means connected in the hydraulic system to selectively actuate the second brake means to exert braking effort on the aircraft wheels and de-actuate the brake means to free the wheels of such braking effort, and a second hydraulically powered reciprocative brake positioning means connected in the hydraulic system for positioning and moving the second brake means rotationally, and wherein the control means selectively operate the first-mentioned and second brake actuator means to actuate the brake means in alternate sequence while simultaneously operating therewith their respectively associated brake positioning means, whereby the wheel means are rotated by increments alternately by the two brake means and respectively associated power reciprocated brake positioning means.

8. The apparatus defined in claim 7, including interconnecting means between the first-mentioned and second powered reciprocative brake positioning means operable simultaneously with moving the first-mentioned brake positioning means in one direction for moving the second brake positioning means in the reverse direction and wherein the control means are selectively operable to first actuate one or the other of the brake actuator means depending upon the desired direction of rotation of the wheel means.

9. The apparatus defined in claim 7, wherein the first-mentioned and second brake positioning means each include hydraulic piston means and cooperating cylinder means defining first and second pressure chambers alternatively pressurized with hydraulic pressure fluid to move the brake positioning means in one direction or the other, and further including hydraulic flow interconnecting means for connecting the first working chamber of the first-mentioned brake positioning means with the second chamber in the second brake positioning means such that the exhaust hydraulic fluid flow produced by movement of the first-mentioned brake positioning means in the one direction moves simultaneously therewith the second brake positioning means in the reverse direction and alternately the exhaust flow produced by movement of the second brake positioning means in the one direction moves simultaneously therewith the first-mentioned brake positioning means in the reverse direction.

10. The apparatus defined in claim 9, wherein the control means includes cycling valve means operable between a first position wherein hydraulic pressure fluid is supplied from the hydraulic system directly to the first-mentioned brake positioning means and associated brake actuator means and alternately a second position wherein hydraulic pressure fluid is supplied directly to the second brake positioning means and associated brake actuator means and means for shifting the cycling valve between the first and second positions so as alternately to move under the direct influence of hydraulic pressure fluid the first-mentioned and second brake positioning means in the same direction while simultaneously actuating therewith their respectively associated brake means.

11. The apparatus defined in claim 10, wherein the shifting means includes valve actuator means operable periodically to change the position of the cycling valve irrespective of whether both the first-mentioned and second brake positioning means, respectively, have completed movement in either direction.

12. The apparatus defined in claim 10, wherein the shifting means includes valve actuator means operable to change the position of the cycling valve means, and position sensitive control means responsive to the respective positions of the first-mentioned and second brake positioning means for operating the valve actuator means only when both the first-mentioned and second brake positioning means, respectively, have completed movement in either direction.

13. The apparatus defined in claim 12, wherein the position sensitive control means includes logic means comprising: a summing device having input elements responsively connected respectively to the first and second-mentioned limit responsive means and an output connected to the valve actuator means to operate the valve actuator means in response to simultaneous actuation of both of the input elements.

14. The apparatus defined in claim 12, wherein the valve actuator means includes pressure actuated valve positioning means for changing the position of the cycling valve means, and pilot valve means responsive to the position sensitive means for pressure actuating the valve positioning means.

15. The apparatus defined in claim 10, wherein the control means further includes reversing valve means interposed between the cycling valve means and the first-mentioned and second brake actuator means cooperable with the cycling valve means to alternatively supply hydraulic pressure fluid directly to the first-mentioned brake positioning means and the brake actuator means associated with the second brake positioning means and alternately to the second brake positioning means and the brake actuator means associated with the first-mentioned brake positioning means.

16. The apparatus defined in claim 9, wherein the hydraulic piston means defines first and second by-pass conduits therein, one-way valve means for permitting hydraulic fluid flow respectively through the by-pass conduits in opposite directions only, and valve means normally closing each of the conduits in response to hydraulic fluid flow in the direction permitted by the one-way valve means, and means for opening one of the normally closed valve means when the piston means reach one limit of movement and means for opening the other of the normally closed valve means when the piston means reach the other limit of movement.

17. The apparatus defined in claim 6, including means for de-actuating the brake means independently of the control means in response to the brake positioning means nearing the end of movement thereof in either direction.

18. The apparatus defined in claim 17, wherein said de-actuating means includes valve means operable between a first position for permitting flow of hydraulic pressure fluid to the brake actuator means and alternatively a second position for blocking the flow of hydraulic pressure fluid to the brake actuator means, and means responsive to the brake positioning means nearing either end of movement thereof for actuating the valve means to the second position.

19. The apparatus defined in claim 7, wherein the wheels include first and second wheels respectively operable with the first-mentioned and second brake means and their respectively associated brake positioning means.

20. The apparatus defined in claim 19, wherein the first and second wheels are rotatably mounted on the landing gear means in fore and aft relationship with one another.

21. The apparatus defined in claim 19, wherein the first and second wheels are rotatably mounted on the landing gear means in side-by-side relationship with one another.

22. The apparatus defined in claim 7, wherein the wheels are disposed in groups on either side of the aircraft fuselage, and wherein the first-mentioned and second brake means and their respectively associated brake positioning means operate with two wheels of one of the wheel groups and further including third and fourth hydraulically powered brake means including third and fourth braking actuator means connected in the hydraulic system, hydraulically powered reciprocative brake positioning means respectively associated therewith operable with two wheels of a corresponding wheel group on the opposite side of the fuselage and second control means connected in the hydraulic system for selectively operating the third and fourth brake actuator means to actuate the third and fourth brake means in alternate sequence while simultaneously operating therewith their respectively associated brake positioning means, whereby the aircraft is driven by rotating the two wheels of each of the opposite wheel groups in equal rotative increments or alternatively is steered by rotating the two wheels of each of the opposite wheel groups in unequal rotative increments.

23. A method of alternatively driving and braking at least one rotary component of the traction drive apparatus of a ground-borne vehicle having at least one selectively rotatable brake associated with the rotary component, comprising the steps of:
actuating the brake while simultaneously rotating the brake in one direction to rotate the rotary component and alternately de-actuating the brake while simultaneously rotating the brake in the reverse direction without rotation of the rotary component; and
alternatively actuating the brake while simultaneously maintaining the brake stationary.

* * * * *